(12) United States Patent
Glennon et al.

(10) Patent No.: US 10,645,857 B2
(45) Date of Patent: May 12, 2020

(54) IMPLEMENT CONTROL SYSTEM HAVING A MANUAL OVERRIDE

(71) Applicant: CNH Industrial America LLC, New Holland, PA (US)

(72) Inventors: Michael W. Glennon, Normal, IL (US); Duqiang Wu, Bolingbrook, IL (US); John C. Endsley, Washington, IL (US); Christopher Stovall, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 108 days.

(21) Appl. No.: 16/047,500

(22) Filed: Jul. 27, 2018

(65) Prior Publication Data

US 2020/0029485 A1 Jan. 30, 2020

(51) Int. Cl.
| | | |
|---|---|---|
| *A01B 63/00* | (2006.01) | |
| *A01B 63/32* | (2006.01) | |
| *A01B 63/22* | (2006.01) | |
| *F15B 11/10* | (2006.01) | |
| *A01B 49/02* | (2006.01) | |
| *A01B 3/24* | (2006.01) | |
| *A01B 5/04* | (2006.01) | |

(52) U.S. Cl.
CPC ............ *A01B 63/32* (2013.01); *A01B 63/008* (2013.01); *A01B 63/22* (2013.01); *F15B 11/10* (2013.01); *A01B 3/24* (2013.01); *A01B 5/04* (2013.01); *A01B 49/027* (2013.01); *F15B 2211/455* (2013.01); *F15B 2211/46* (2013.01); *F15B 2211/6313* (2013.01); *F15B 2211/6336* (2013.01); *F15B 2211/6654* (2013.01); *F15B 2211/7053* (2013.01); *F15B 2211/7656* (2013.01)

(58) Field of Classification Search
CPC ......... E02F 9/2203; E02F 3/432; E02F 3/437; A01B 63/008; A01B 63/32; F15B 2211/765; F15B 11/166; F15B 2211/77; F15B 2211/7741; F15B 2211/7656
See application file for complete search history.

(56) References Cited

U.S. PATENT DOCUMENTS

| | | |
|---|---|---|
| 4,024,796 A | 5/1977 | Theobald |
| 4,355,688 A | 10/1982 | Hamm et al. |
| 4,518,043 A | 5/1985 | Anderson et al. |

(Continued)

*Primary Examiner* — Abiy Teka
(74) *Attorney, Agent, or Firm* — Rebecca L. Henkel; Rickard K. DeMille

(57) ABSTRACT

An implement control system includes an automatic control valve assembly configured to utilize fluid from a supply conduit to cause a cylinder to raise a ground engaging tool relative to a soil surface and to utilize the fluid flow from the supply conduit to cause the cylinder to lower the ground engaging tool relative to the soil surface while an automatic control mode is active. The implement control system also includes a controller configured to control the automatic control valve assembly based on a position of the ground engaging tool relative to the soil surface to control the position of the ground engaging tool relative to the soil surface while the automatic control mode is active. The controller is also configured to deactivate the automatic control mode in response to fluid pressure within a first manual control conduit exceeding a threshold pressure.

20 Claims, 3 Drawing Sheets

(56) References Cited

U.S. PATENT DOCUMENTS

| | | |
|---|---|---|
| 4,579,038 A | 4/1986 | Winter |
| 4,646,620 A | 3/1987 | Buchl |
| 4,934,463 A | 6/1990 | Ishida et al. |
| 5,653,292 A | 8/1997 | Ptacek et al. |
| 5,784,944 A * | 7/1998 | Tozawa ............... E02F 3/437 91/361 |
| 6,070,539 A | 6/2000 | Flamme et al. |
| 6,076,611 A | 6/2000 | Rozendaal et al. |
| 6,164,385 A | 12/2000 | Buchl |
| 6,382,326 B1 | 5/2002 | Goins et al. |
| 6,758,128 B2 * | 7/2004 | Iga ................... E02F 9/2203 60/422 |
| 7,913,491 B2 * | 3/2011 | Lin ................... E02F 9/2203 60/468 |
| 7,962,263 B2 | 6/2011 | Wang |
| 8,311,709 B2 | 11/2012 | Vanhercke et al. |
| 9,078,392 B2 | 7/2015 | Van Buskirk et al. |
| 9,307,689 B2 * | 4/2016 | Adams ................ A01C 7/203 |
| 2012/0285318 A1 * | 11/2012 | Jessen ............... A01B 63/1006 91/403 |

* cited by examiner

IMPLEMENT CONTROL SYSTEM HAVING A MANUAL OVERRIDE

BACKGROUND

The present disclosure relates generally to an implement control system having a manual override.

Certain agricultural implements include ground engaging tools configured to interact with the soil. For example, a tillage implement may include tillage points and/or disc blades configured to break up the soil for subsequent planting or seeding operations. Tillage implements typically include one or more actuators (e.g., hydraulic cylinders) configured to control a penetration depth of the ground engaging tools into the soil. The actuator(s) may also move the ground engaging tools between a lowered/ground engaging position and a raised/transport portion (e.g., to facilitate repositioning the tillage implement between successive rows). The actuator(s) are typically controlled by an electronic control system having one or more electrically operated valves configured to control fluid flow (e.g., hydraulic fluid flow) to the actuator(s). Certain electronic control systems may be operated in an automatic mode (e.g., in which the penetration depth of the ground engaging tools is automatically maintained at a target depth) and in manual mode. In the manual mode, an operator may control the position of the ground engaging tools by providing input to a user interface (e.g., buttons on a control panel, etc.). Unfortunately, the process of manually controlling the position of the ground engaging tools using the user interface may not be intuitive, thereby increasing the duration associated with manually moving the ground engaging tools (e.g., manually raising the ground engaging tools at the end of a row, etc.).

BRIEF DESCRIPTION

In certain embodiments, an implement control system includes a supply conduit configured to receive fluid from a fluid source and a return conduit configured to output the fluid to a reservoir. In addition, the implement control system includes a first inlet configured to fluidly couple to a manual control valve and a second inlet configured to fluidly couple to the manual control valve. The implement control system also includes a first manual control conduit fluidly coupled to the first inlet and configured to provide fluid flow to cause a cylinder to raise a ground engaging tool relative to a soil surface. Furthermore, the implement control system includes a second manual control conduit fluidly coupled to the second inlet and configured to provide fluid flow to cause the cylinder to lower the ground engaging tool relative to the soil surface. The implement control system also includes an automatic control valve assembly fluidly coupled to the supply conduit and the return conduit. The automatic control valve assembly is configured to utilize fluid flow from the supply conduit to cause the cylinder to raise the ground engaging tool relative to the soil surface and to utilize fluid flow from the supply conduit to cause the cylinder to lower the ground engaging tool relative to the soil surface while an automatic control mode is active. In addition, the implement control system includes a pressure sensor fluidly coupled to the first manual control conduit and configured to output a signal indicative of a fluid pressure within the first manual control conduit. The implement control system also includes a controller having a memory and a processor. The controller is communicatively coupled to the automatic control valve assembly and the pressure sensor, the controller is configured to control the automatic control valve assembly based on a position of the ground engaging tool relative to the soil surface to control the position of the ground engaging tool relative to the soil surface while the automatic control mode is active, and the controller is configured to deactivate the automatic control mode in response to the fluid pressure within the first manual control conduit exceeding a threshold pressure.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
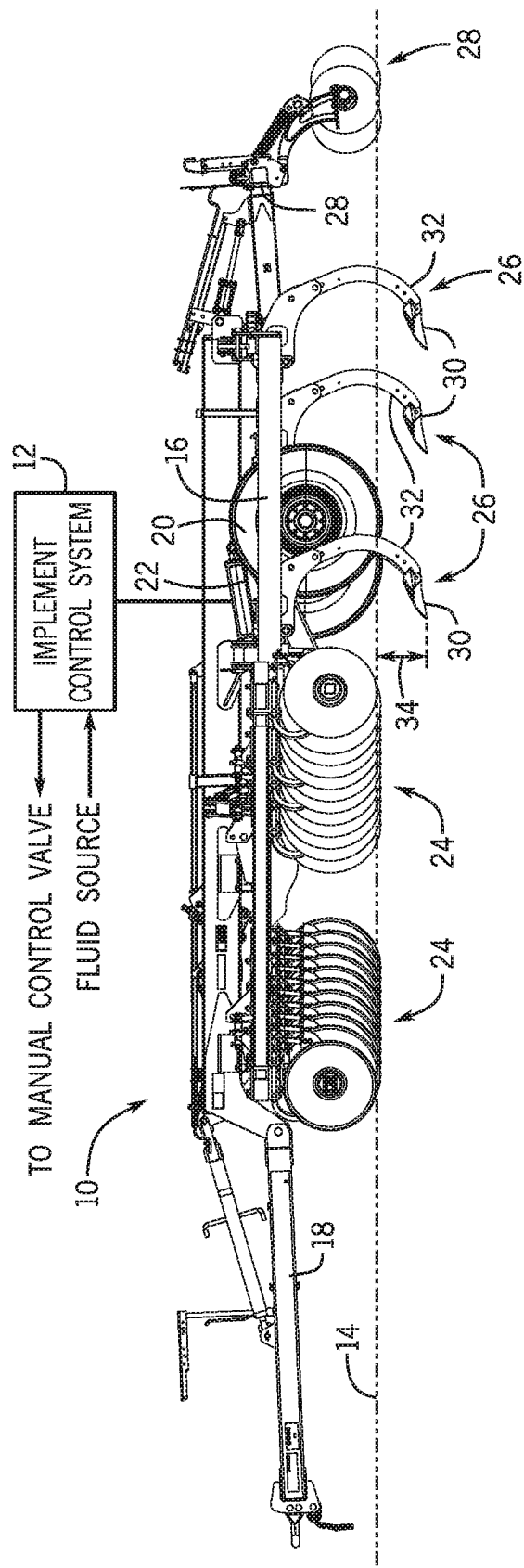
FIG. 1 is a side view of an embodiment of an agricultural implement having an implement control system.

Turning to the drawings, FIG. 1 is a side view of an embodiment of an agricultural implement 10 having an implement control system 12. In the illustrated embodiment, the agricultural implement 10 is a primary tillage implement having multiple ground engaging tools configured to till soil 14. As illustrated, the agricultural implement 10 includes a frame 16 and a hitch assembly 18 coupled to the frame 16. The hitch assembly 18 is configured to couple to a work vehicle (e.g., tractor), and the work vehicle is configured to tow the agricultural implement 10 through a field. In the illustrated embodiment, the agricultural implement 10 includes wheels 20 configured to engage the surface of the soil 14 and to support at least a portion of the agricultural implement 10. In addition, the agricultural implement 10 includes an actuator 22 (e.g., cylinder) configured to move the wheels 20 from the illustrated raised position to a lowered position. While the wheels 20 are in the illustrated raised position, ground engaging tools of the agricultural implement 10 engage the soil 14. As the agricultural implement 10 is towed through the field, the ground engaging tools break up the soil for subsequent planting or seeding operations. The actuator 22 may lower the wheels 20 from the illustrated raised position to the lowered position. As a result, the ground engaging tools are disengaged from the soil 14 to facilitate transport of the agricultural implement 10 (e.g., between successive rows of the field).

In the illustrated embodiment, the agricultural implement 10 includes disc blades 24, tillage point assemblies 26, and leveling discs 28. The disc blades 24 are configured to engage a top layer of the soil. As the agricultural implement 10 is towed through the field, the disc blades 24 are driven to rotate, thereby breaking up the top layer and sizing residue on the surface of the field. In the illustrated embodiment, the disc blades 24 are arranged in two rows. However, in alternative embodiments, the disc blades may be arranged in more or fewer rows (e.g., 1, 2, 3, 4, 5, 6, or more). In addition, the angle of each row may be selected to control the interaction of the disc blades 24 with the top layer of soil. The tillage point assemblies 26 are configured to engage the soil at a greater depth, thereby breaking up a lower layer of the soil 14. In the illustrated embodiment, each tillage point assembly 26 includes a tillage point 30 and a shank 32. The shank 32 is configured to position the tillage point 30 at a target depth 34 beneath the soil surface, and the tillage point 30 is configured to break up the soil 14. The shape of each tillage point, the arrangement of the tillage point assemblies, and the number of tillage point assemblies may be selected to control tillage within the field. Furthermore, as the agricultural implement 10 is towed through the field, the leveling discs 28 are driven to rotate, thereby sizing soil clods, leveling the soil surface, smoothing the soil surface, and/or cutting residue on the soil surface.

As illustrated, the implement control system 12 is fluidly coupled to the actuator 22 and configured to control the actuator 22 during operation of the agricultural implement 10, thereby controlling the position of the ground engaging tools (e.g., the disc blades 24, the tillage point assemblies 26, and the leveling discs 28) relative to the surface of the soil 14. In certain embodiments, the implement control system 12 includes a supply conduit configured to receive fluid (e.g., hydraulic fluid) from a fluid source and a return conduit configured to output fluid to a reservoir. The implement control system 12 also includes a first inlet configured to fluidly couple to a manual control valve (e.g., of the work vehicle) and a second inlet configured to fluidly couple to the manual control valve. In addition, the implement control system 12 includes a first manual control conduit fluidly coupled to the first inlet and configured to provide fluid flow (e.g., while the manual control valve is in a raise position) to cause the actuator 22 to raise the ground engaging tools relative to the soil surface. The implement control system 12 also includes a second manual control conduit fluidly coupled to the second inlet and configured to provide fluid flow (e.g., while the manual control valve is in a lower position) to cause the actuator 22 to lower the ground engaging tools relative to the soil surface.

Furthermore, the implement control system 12 includes an automatic control valve assembly fluidly coupled to the supply conduit and the return conduit. The automatic control valve assembly is configured to utilize fluid flow from the supply conduit to cause the actuator to raise the ground engaging tools relative to the soil surface and to utilize fluid flow from the supply conduit to cause the actuator to lower the ground engaging tools relative to the soil surface while an automatic control mode is active. The implement control system 12 also includes a pressure sensor fluidly coupled to the first manual control conduit and configured to output a signal indicative of a fluid pressure within the first manual conduit. In addition, the control system 12 includes a controller communicatively coupled to the automatic control valve assembly and the pressure sensor. The controller is configured to control the automatic control valve assembly based on a position of the ground engaging tools relative to the soil surface to control the position of the ground engaging tools relative to the soil surface while the automatic control mode is active. In addition, the controller is configured to deactivate the automatic control mode in response to the fluid pressure within the first manual control conduit exceeding a threshold pressure. With the automatic control mode deactivated, the operator may utilize the manual control valve to control the position of the ground engaging tools relative to the soil surface. Utilizing the manual control valve to control the position of the ground engaging tools may be more intuitive than providing input to a user interface (e.g., via one or more buttons, one or more switches, a touch screen interface, etc.), thereby reducing the duration associated with manually moving the ground engaging tools (e.g., manually raising the ground engaging tools at the end of a row, etc.). In addition, utilizing the manual control valve to control the position of the ground engaging tools facilitates control of the ground engaging tool position while the automatic control valve assembly is disabled (e.g., due to lack of electrical power).

While a single actuator 22 is controlled by the implement control system 12 in the illustrated embodiment, in other embodiments, the agricultural implement 10 may include more actuators controlled by the implement control system. For example, in certain embodiments, the position of each ground engaging tool may be controlled by a respective actuator, or the position of each group of ground engaging tools (e.g., the disc blades 24, the tillage point assemblies 26, the leveling discs 28, etc.) may be controlled by a respective actuator. In such embodiments, the implement control system may control the actuators individually, together, or in groups. Furthermore, while the illustrated agricultural implement includes the disc blades 24, the tillage point assemblies 26, and the leveling discs 28, in other embodiments, the agricultural implement may include other and/or additional ground engaging tools (e.g., finishing reels configured to size clods and/or smooth the field surface, etc.). In addition, while the implement control system described herein is used to control the position of ground engaging tools of a tillage implement, in other embodiments, the implement control system may be utilized to control the position of ground engaging tools of other suitable implements (e.g., a planting implement, a seeding implement, a harvesting implement, etc.).

Figure 2:
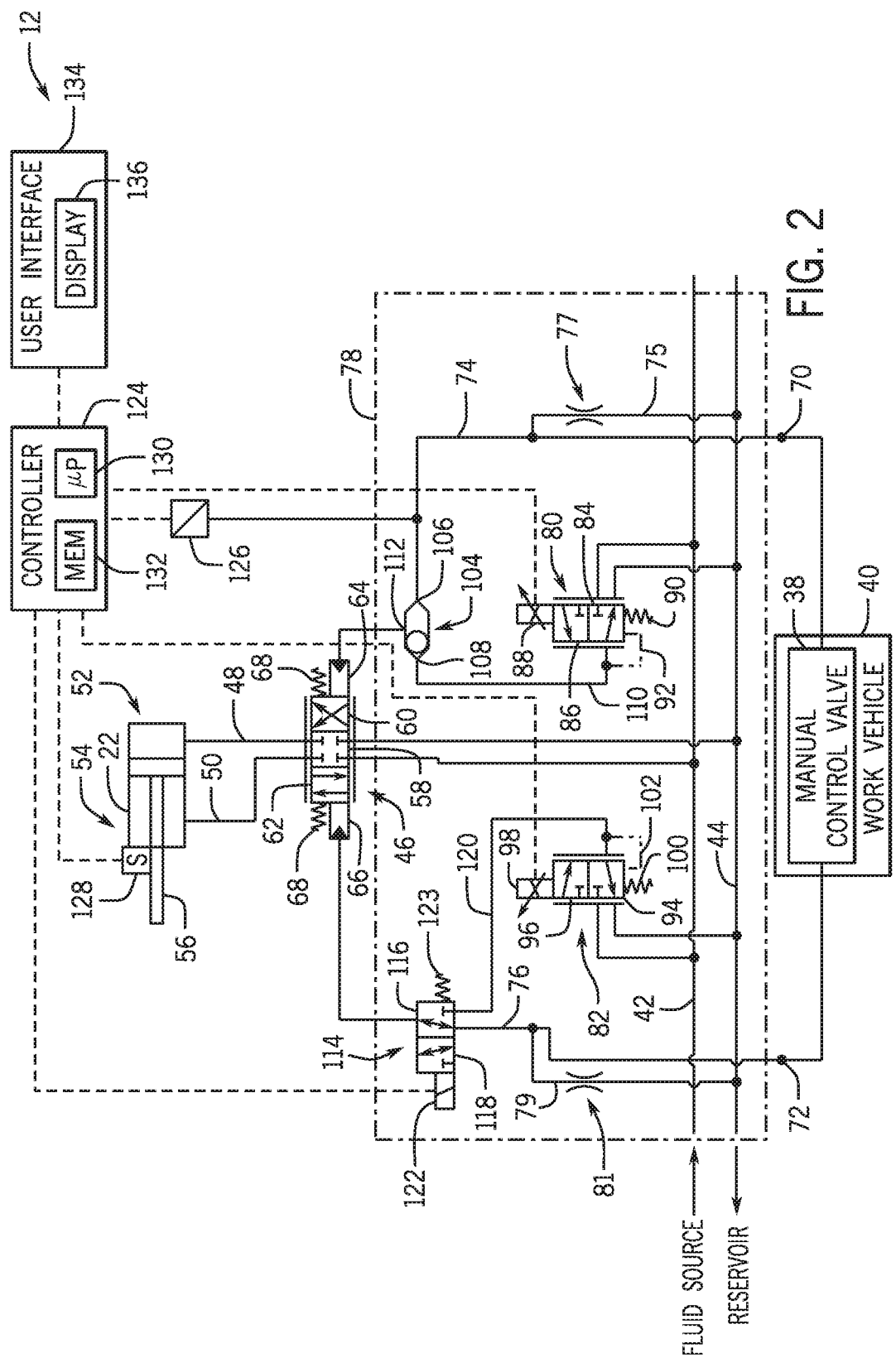
FIG. 2 is a schematic diagram of an embodiment of an implement control system that may be employed within the agricultural implement of FIG. 1.

FIG. 2 is a schematic diagram of an embodiment of an implement control system 12 that may be employed within the agricultural implement of FIG. 1. As discussed in detail below, the implement control system 12 is configured to automatically control the position of the ground engaging tools relative to the soil surface using an automatic control valve assembly, and the implement control system 12 is configured to facilitate manual control of the position of the ground engaging tools by receiving fluid input from a manual control valve 38 of a work vehicle 40 (e.g., the tow vehicle). Furthermore, the implement control system is configured to automatically disengage automatic control in response to determining that the manual control valve 38 is moved to a position that causes the implement control system to raise the ground engaging tools.

In the illustrated embodiment, the implement control system 12 includes a supply conduit 42 configured to receive fluid (e.g., hydraulic fluid) from a fluid source. The implement control system 12 also includes a return conduit 42 configured to output fluid to a reservoir. The fluid source may include a pump (e.g., hydraulic pump) disposed on the work vehicle, and the reservoir may include a tank (e.g., hydraulic fluid tank) disposed on the work vehicle. The pump may be fluidly coupled to the tank, thereby circulating hydraulic fluid through the implement control system 12.

Furthermore, the implement control system 12 includes a cylinder control valve 46 fluidly coupled to the supply conduit 42 and the return conduit 44. The cylinder control valve 46 is also fluidly coupled to a first cylinder conduit 48 and a second cylinder conduit 50. In the illustrated embodiment, the first cylinder conduit 48 is fluidly coupled to a cap end 52 (e.g., first end) of the actuator 22, and the second cylinder conduit 50 is fluidly coupled to a rod end 54 (e.g., second end) of the actuator 22. Providing fluid to the cap end 52 of the actuator 22 drives a piston rod 56 to extend, and providing fluid to the rod end 54 of the actuator 22 drives the piston rod 56 to retract. In the illustrated embodiment, extension of the piston rod 56 drives the ground engaging tools of the implement upwardly relative to the soil surface (e.g., by driving the wheels of the implement downwardly relative to the implement frame), and retraction of the piston rod 56 drives the ground engaging tools of the implement downwardly relative to the soil surface (e.g., by driving the wheels of the implement upwardly relative to the implement frame). However, in other embodiments, extension of the piston rod may drive the ground engaging tools downwardly relative to the soil surface, and retraction of the piston rod may drive the ground engaging tools upwardly relative to the soil surface. In such embodiments, the first cylinder conduit 48 may be fluidly coupled to the rod end (e.g., first end) of the actuator, and the second cylinder conduit 50 may be coupled to the cap end (e.g., second end) of the actuator. Furthermore, in certain embodiments, multiple actuators may be utilized to control the position of the ground engaging tools relative to the soil surface. In such embodiments, the actuators may be fluidly coupled to one another in a series arrangement, in a parallel arrangement, in another suitable arrangement, or a combination thereof.

In the illustrated embodiment, the cylinder control valve 46 is a proportional three position/four way valve. The first position 58 is configured to block fluid flow between the supply conduit 42 and the first and second cylinder conduits and between the return conduit 44 and the first and second cylinder conduits, thereby blocking fluid flow between the supply conduit 42 and both ends of the actuator 22 and between the return conduit 44 and both ends of the actuator 22. The second position 60 of the cylinder control valve 46 is configured to facilitate fluid flow between the supply conduit 42 and the cap end 52 of the actuator 22 (e.g., via the first cylinder conduit 48) and between the return conduit 44 and the rod end 54 of the actuator 22 (e.g., via the second cylinder conduit 50) to drive the actuator 22 to raise the ground engaging tools relative to the soil surface. The third position 62 of the cylinder control valve 46 is configured to facilitate fluid flow between the supply conduit 42 and the rod end 54 of the actuator 22 and between the return conduit 44 and the cap end 52 of the actuator 22 to drive the actuator 22 to lower the ground engaging tools relative to the soil surface. In the illustrated embodiment, the cylinder control valve 46 is a proportional control valve configured to control the fluid flow rate through the valve (e.g., based on the position of the valve relative to the first position). However, in other embodiments, the cylinder control valve may be another suitable type of valve configured to control fluid flow between the supply and return conduits and the actuator.

In the illustrated embodiment, the cylinder control valve 46 includes a raise actuator 64 configured to drive the cylinder control valve 46 to the second position 60. And, the cylinder control valve 46 includes a lower actuator 66 configured to drive the cylinder control valve 46 to the third position 62. In the illustrated embodiment, the raise actuator 64 and the lower actuator 66 are fluid actuators (e.g., hydraulic actuators) configured to move the cylinder control valve 46 in response to receiving fluid flow (e.g., hydraulic fluid flow). In addition, the cylinder control valve 46 includes biasing elements 68 (e.g., springs) configured to urge the cylinder control valve 46 toward the first position 58. Accordingly, applying fluid pressure to the raise actuator 64 drives the cylinder control valve 46 to the second position 60, thereby causing the actuator 22 to raise the ground engaging tools relative to the soil surface. Furthermore, applying fluid pressure to the lower actuator 66 drives the cylinder control valve 46 to the third position 62, thereby causing the actuator 22 to lower the ground engaging tools relative to the soil surface. Furthermore, if no fluid pressure is applied to either actuator, the biasing elements 68 drive the cylinder control valve 46 to the first position 58, thereby blocking fluid flow between the supply and return conduits and the actuator 22.

In the manual control mode, the fluid pressure to the actuators of the cylinder control valve may be controlled by the manual control valve 38 within the work vehicle 40. In the illustrated embodiment, the implement control system 12 includes a first inlet 70 configured to fluidly couple to the manual control valve 38, and a second inlet 72 configured to fluidly couple to the manual control valve 38. The implement control system 12 also includes a first manual control conduit 74 configured to establish a fluid connection between the first inlet 70 and the raise actuator 64 of the cylinder control valve 46. As illustrated, a first drain conduit 75 fluidly couples the first manual control conduit 74 and the return conduit 44. A flow restrictor 77 (e.g., orifice) is disposed along the first drain conduit 75 to restrict flow between the first manual control conduit 74 and the return conduit 44. Accordingly, while fluid is provided to the first manual control conduit 74, the fluid pressurizes the first manual control conduit 74 and drains to the return conduit 44 via the flow restrictor 77 and the first drain conduit 75. The fluid pressure within the first manual control conduit 74 induces the raise actuator 64 to drive the cylinder control valve 46 to the second position. In addition, the implement control system 12 includes a second manual control conduit 76 configured to establish a fluid connection between the second inlet 72 and the lower actuator 66 of the cylinder control valve 46. As illustrated, a second drain conduit 79 fluidly couples the second manual control conduit 76 and the return conduit 44. A flow restrictor 81 (e.g., orifice) is disposed along the second drain conduit 79 to restrict flow between the second manual control conduit 76 and the return conduit 44. Accordingly, while fluid is provided to the second manual control conduit 76, the fluid pressurizes the second manual control conduit 76 and drains to the return conduit 44 via the flow restrictor 81 and the second drain conduit 79. The fluid pressure within the second manual control conduit 76 induces the lower actuator 66 to drive the cylinder control valve 46 to the third position. While the illustrated embodiment includes the drain conduits and the flow restrictors, in other embodiments, at least one of the drain conduits/flow restrictors may be omitted, and the fluid may drain through other elements (e.g., through the manual control valve, etc.).

The manual control valve 38 is configured to transition between a raise position, a lower position, and a neutral position. While the manual control valve 38 is in the raise position, the manual control valve 38 facilitates fluid flow from a fluid source (e.g., the same fluid source that provides fluid to the supply conduit 42) to the first inlet 70 and facilitates fluid flow from the second inlet 72 to a reservoir (e.g., the same reservoir that receives fluid from the return conduit 44), thereby driving the cylinder control valve 46 to the second position 60 to cause the actuator 22 to raise the ground engaging tools relative to the soil surface. Furthermore, while the manual control valve 38 is in the lower position, the manual control valve 38 facilitates fluid flow from the fluid source to the second inlet 72 and facilitates fluid flow from the first inlet 70 to the reservoir, thereby driving the cylinder control valve 46 to the third position 62 to cause the actuator 22 to lower the ground engaging tools relative to the soil surface. In addition, while the manual control valve 38 is in the neutral position, the manual control valve 38 blocks fluid flow between the fluid source and the inlets and between the reservoir and the inlets, thereby enabling the cylinder control valve 46 to move to the first position 58 to block fluid flow between the supply and return conduits and the actuator. The manual control valve 38 may include a lever or other suitable actuator configured to enable an operator (e.g., positioned within a cab of the work vehicle 40) to move the manual control valve 38 between the raise, lower, and neutral positions. Accordingly, the operator may manually control the position of the ground engaging tools relative to the soil surface while the implement control system 12 is in the manual control mode by providing input to the manual control valve 38.

In the illustrated embodiment, the implement control system 12 includes an automatic control valve assembly 78 fluidly coupled to the supply conduit 42, the return conduit 44, the raise actuator 64 of the cylinder control valve 46, and the lower actuator 66 of the cylinder control valve 46. As discussed in detail below, the automatic control valve assembly 78 is configured to control the cylinder control valve 46 to control the position of the ground engaging tools relative to the soil surface while the implement control system 12 is in the automatic control mode. In the illustrated embodiment, the automatic control valve assembly 78 includes a raise control valve 80 and a lower control valve 82. In addition, as discussed in detail below, the automatic control valve assembly 78 includes a shuttle valve and a selection control valve. The raise control valve 80 is configured to control fluid flow from the supply conduit 42 to the raise actuator 64 of the cylinder control valve 46, and the lower control valve 82 is configured to control fluid flow from the supply conduit 42 to the lower actuator 66 of the cylinder control valve 46. Accordingly, the automatic control valve assembly 78 may control the cylinder control valve 46 via actuation of the raise control valve 80 and the lower control valve 82.

In the illustrated embodiment, the raise control valve 80 is a proportional two position/three way valve. The first position 84 is configured to block fluid flow between the supply conduit 42 and the raise actuator 64 of the cylinder control valve 46, and the second position 86 is configured to facilitate fluid flow between the supply conduit 42 and the raise actuator 64 of the cylinder control valve 46. In addition, the raise control valve 80 includes an actuator 88 (e.g., solenoid, etc.) configured to drive the raise control valve 80 from the first position 84 to the second position 86. The raise control valve 80 also includes a biasing element 90 (e.g., spring, etc.) and a pilot line 92 configured to urge the raise control valve 80 toward the first position 84. In the illustrated embodiment, the raise control valve 80 is a proportional control valve configured to control the fluid flow rate through the valve (e.g., based on the position of the valve relative to the first position). However, in other embodiments, the raise control valve may be another suitable type of valve configured to control fluid flow between the supply conduit and the raise actuator of the cylinder control valve.

Furthermore, the lower control valve 82 is a proportional two position/three way valve. The first position 94 is configured to block fluid flow between the supply conduit 42 and the lower actuator 66 of the cylinder control valve 46, and the second position 96 is configured to facilitate fluid flow between the supply conduit 42 and the lower actuator 66 of the cylinder control valve 46. In addition, the lower control valve 82 includes an actuator 98 (e.g., solenoid, etc.) configured to drive the lower control valve 82 from the first position 94 to the second position 96. The lower control valve 82 also includes a biasing element 100 (e.g., spring, etc.) and a pilot line 102 configured to urge the lower control valve 82 toward the first position 94. In the illustrated embodiment, the lower control valve 82 is a proportional control valve configured to control the fluid flow rate through the valve (e.g., based on the position of the valve relative to the first position). However, in other embodiments, the lower control valve may be another suitable type of valve configured to control fluid flow between the supply conduit and the lower actuator of the cylinder control valve.

In the illustrated embodiment, the automatic control valve assembly 78 includes a shuttle valve 104 having a first input 106 fluidly coupled to the first manual control conduit 74. The shuttle valve 104 also includes a second input 108 fluidly coupled to the raise control valve 80 via a raise control conduit 110. In addition, the shuttle valve 104 includes an outlet 112 fluidly coupled to the raise actuator 64 of the cylinder control valve 46. The shuttle valve 104 is configured to block fluid flow from the first manual control conduit 74 to the raise actuator 64 of the cylinder control valve 46 while the fluid pressure from the raise control valve 80 (e.g., the fluid pressure within the raise control conduit 110) is greater than the fluid pressure within the first manual control conduit 74, and the shuttle valve 104 is configured to block fluid flow from the raise control valve 80 to the raise actuator 64 of the cylinder control valve 46 while the fluid pressure within the first manual control conduit 74 is greater than the fluid pressure from the raise control valve 80 (e.g., the fluid pressure within the raise control conduit 110). Accordingly, fluid from the conduit (of the first manual control conduit 74 and the raise control conduit 110) having the higher pressure flows to the raise actuator 64 to control the cylinder control valve 46.

Furthermore, in the illustrated embodiment, the automatic control valve assembly 78 includes a selection control valve 114. The selection control valve 114 is a two position/three way valve. The first position 116 is configured to block fluid flow from the lower control valve 82 to the lower actuator 66 of the cylinder control valve 46 and to facilitate fluid flow from the second manual control conduit 76 to the lower actuator 66 of the cylinder control valve 46. In addition, the second position 118 is configured to facilitate fluid flow from the lower control valve 82 to the lower actuator 66 of the cylinder control valve 46 (e.g., via a lower control conduit 120) and to block fluid flow from the second manual control conduit 76 to the lower actuator 66 of the cylinder control valve 46. The selection control valve 114 includes an actuator 122 (e.g., solenoid, etc.) configured to drive the selection control valve 114 from the first position 116 to the second position 118. In addition, the selection control valve 114 includes a biasing element 123 (e.g., spring, etc.) configured to urge the selection control valve 114 toward the first position 116. As discussed in detail below, the position of the selection control valve 114 may be controlled by the actuator 122 to selectively provide fluid flow from the manual control valve 38 (e.g., via the second manual control conduit 76) and the lower control valve 82 (e.g., via the lower control conduit 120) to the lower actuator 66 of the cylinder control valve 46.

In the illustrated embodiment, the implement control system 12 includes a controller 124, a pressure sensor 126, and a position sensor 128. The pressure sensor 126 is fluidly coupled to the first manual control conduit 74 and configured to output a signal indicative of a fluid pressure within the first manual control conduit 74. In addition, the position sensor 128 is configured to output a signal indicative of the position of the ground engaging tools relative to the soil surface. In the illustrated embodiment, the position sensor 128 is coupled to the actuator 22 (e.g., integrated within the actuator 22) and configured to monitor the position of the piston rod 56 relative to the cylinder body of the actuator 22. As previously discussed, extension and retraction of the piston rod 56 adjusts the position of the ground engaging tools relative to the soil surface. Accordingly, monitoring the position of the piston rod 56 facilitates determination of the position of the ground engaging tools relative to the soil surface. The position sensor 128 may include a linearly variable differential transformer (LVDT), a linear potentiometer, an ultrasonic sensor, a proximity sensor, an infrared sensor, another suitable sensor, or a combination thereof. Furthermore, while the position sensor 128 is configured to monitor the position of the piston rod 56 in the illustrated embodiment, in other embodiments, the position sensor may be configured to monitor another suitable element to facilitates determination of the position of the ground engaging tools relative to the soil surface (e.g., monitor the position of the implement frame relative to the soil surface, monitor the position of the ground engaging tools relative to the soil surface, etc.).

In the illustrated embodiment, the controller 124 is communicatively coupled to the pressure sensor 126 and the position sensor 128. In addition, the controller 124 is communicatively coupled to the automatic control valve assembly 78. As illustrated, the controller is communicatively coupled to the actuator 88 of the raise control valve 80, to the actuator 98 of the lower control valve 82, and to the actuator 122 of the selection control valve 114 of the automatic control valve assembly 78. As discussed in detail below, the controller 124 is configured to control the automatic control valve assembly 78 based on the position of the ground engaging tools relative to the soil surface, and the controller 124 is configured to instruct the automatic control valve assembly 78 to block fluid flow from the supply conduit 42 to the raise actuator 64 and the lower actuator 66 of the cylinder control valve 46 in response to the fluid pressure within the first manual control conduit 74 exceeding a threshold pressure.

In certain embodiments, the controller 124 is an electronic controller having electrical circuitry configured to process data from the pressure sensor 126 and the position sensor 128 and to output instructions to the automatic control valve assembly 78. In the illustrated embodiment, the controller 124 includes a processor, such as the illustrated microprocessor 130, and a memory device 132. The controller 124 may also include one or more storage devices and/or other suitable components. The processor 130 may be used to execute software, such as software for controlling the automatic control valve assembly 78, and so forth. Moreover, the processor 130 may include multiple microprocessors, one or more "general-purpose" microprocessors, one or more special-purpose microprocessors, and/or one or more application specific integrated circuits (ASICS), or some combination thereof. For example, the processor 130 may include one or more reduced instruction set (RISC) processors.

The memory device 132 may include a volatile memory, such as random access memory (RAM), and/or a nonvolatile memory, such as read-only memory (ROM). The memory device 132 may store a variety of information and may be used for various purposes. For example, the memory device 132 may store processor-executable instructions (e.g., firmware or software) for the processor 130 to execute, such as instructions for controlling the automatic control valve assembly 78, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., threshold values, etc.), instructions (e.g., software or firmware for controlling the automatic control valve assembly 78, etc.), and any other suitable data.

In the illustrated embodiment, the implement control system 12 includes a user interface 134 configured to provide input to the controller 124 and to receive output from the controller 124. As illustrated, the user interface 134 includes a display 136. The display 136 is configured to present information to an operator, such as a numeric and/or graphical representation of the position of the ground engaging tools relative to the soil surface. In certain embodiments, the display 136 may be a touch screen display configured to receive input from the operator. The user interface 134 may also include other input devices (e.g., keyboard, mouse, switches, buttons, etc.) configured to receive input from the operator.

The controller 124 is configured to control the automatic control valve assembly 78 while the implement control system 12 is in an automatic control mode. For example, an operator may input a target position of the ground engaging tools relative to the soil surface into the user interface 134, and the operator may engage the automatic control mode via the user interface 134. The user interface 134, in turn, may output signal(s) to the controller 124 indicative of the target position and activation of the automatic control mode. The controller 124 may then output instructions to the automatic control valve assembly 78 to raise or lower the ground engaging tools based on the current position of the ground engaging tools (e.g., which may be determined based on feedback from the position sensor 128) and the target position of the ground engaging tools. In certain embodiments, the controller 124 may be configured to automatically determine the target position of the ground engaging tools relative to the soil surface (e.g., based on the type of implement, the type(s) of ground engaging tool, the type of soil, the type of crops to be planted after tillage operations, soil conditions, etc.).

If the current position of the ground engaging tools is lower than the target position, the controller 124 may instruct the automatic control valve assembly 78 to raise the ground engaging tools. For example, the controller 124 may instruct the actuator 88 of the raise control valve 80 to move the raise control valve 80 toward the second position 86. As previously discussed, the second position 86 of the raise control valve 80 is configured to facilitate fluid flow between the supply conduit 42 and the raise actuator 64 of the cylinder control valve 46. As fluid flows through the raise control valve 80, fluid pressure within the raise control conduit 110 increases to a pressure greater than the fluid pressure within the first manual control conduit 74 (e.g., because the manual control valve 38 is in a neutral position). Accordingly, the shuttle valve 104 blocks fluid flow from the first manual control conduit 74 to the raise actuator 64 and facilitates fluid flow from the raise control valve 80 to the raise actuator 64.

In addition, the controller 124 may instruct the actuator 122 of the selection control valve 114 to move the selection control valve 114 to the second position 118. As previously discussed, the second position 118 of the selection control valve 114 is configured to facilitate fluid flow between the lower control valve 82 and the lower actuator 66 of the cylinder control valve 46. Furthermore, the controller 124 may instruct the actuator 98 of the lower control valve 82 to enable the biasing element 100 and the pilot line 102 to drive the lower control valve 82 to the first position 94. The first position 94 of the lower control valve 82 is configured to facilitate fluid flow between the selection control valve 114 and the return conduit 44 (e.g., via the lower control conduit 120). With the selection control valve 114 in the second position 118 and the lower control valve 82 in the first position 94, fluid from the lower actuator 66 of the cylinder control valve 46 may drain to the reservoir.

While the raise control valve 80 is in the second position 86, fluid flows from the fluid source to the raise actuator 64 of the cylinder control valve 46, thereby driving the cylinder control valve 46 to the second position 60 (e.g., with the lower actuator 66 providing substantially no resistance to movement of the cylinder control valve 46 because the fluid within the lower actuator 66 is able to drain to the reservoir). As a result, fluid flows from the fluid source to the cap end 52 of the actuator 22, which causes the actuator 22 to raise the ground engaging tools relative to the soil surface. Because the raise control valve 80 is a proportional control valve in the illustrated embodiment, the controller 124 may control the fluid flow rate from the fluid source to the raise actuator 64. In addition, because the cylinder control valve 46 is a proportional control valve in the illustrated embodiment, the fluid flow rate to the raise actuator 64 may control the position of the cylinder control valve 46, thereby controlling the flow rate of fluid from the fluid source to the cap end 52 of the actuator 22, which may control the rate at which the actuator 22 raises the ground engaging tools relative to the soil surface.

If the current position of the ground engaging tools is higher than the target position, the controller 124 may instruct the automatic control valve assembly 78 to lower the ground engaging tools. For example, the controller 124 may instruct the actuator 122 of the selection control valve 114 to move the selection control valve 114 to the second position 118. As previously discussed, the second position 118 of the selection control valve 114 is configured to facilitate fluid flow from the lower control valve 82 to the lower actuator 66 of the cylinder control valve 46 (e.g., via the lower control conduit 120). In addition, the controller 124 may instruct the actuator 98 of the lower control valve 82 to move the lower control valve 82 toward the second position 96. As previously discussed, the second position 96 of the lower control valve 82 is configured to facilitate fluid flow between the supply conduit 42 and the lower actuator 66 of the cylinder control valve 46 (e.g., via the lower control conduit 120 and the selection control valve 114 in the second position 118).

In addition, the controller 124 may instruct the actuator 88 of the raise control valve 80 to enable the biasing element 90 and the pilot line 92 to drive the raise control valve 80 to the first position 94. The first position 94 of the raise control valve 80 is configured to facilitate fluid flow between the shuttle valve 104 and the return conduit 44 (e.g., via the raise control conduit 110). With the shuttle valve 104 in the position that facilitates fluid flow between the raise actuator 64 and the raise control valve 80, and with the raise control valve 80 in the first position 84, fluid from the raise actuator 64 of the cylinder control valve 46 may drain to the reservoir.

While the lower control valve 82 is in the second position 96, fluid flows from the fluid source to the lower actuator 66 of the cylinder control valve 46, thereby driving the cylinder control valve 46 to the third position 62 (e.g., with the raise actuator 64 providing substantially no resistance to movement of the cylinder control valve 46 because the fluid within the raise actuator 64 is able to drain to the reservoir). As a result, fluid flows from the fluid source to the rod end 54 of the actuator 22, which causes the actuator 22 to lower the ground engaging tools relative to the soil surface. Because the lower control valve 82 is a proportional control valve in the illustrated embodiment, the controller 124 may control the fluid flow rate from the fluid source to the lower actuator 66. In addition, because the cylinder control valve 46 is a proportional control valve in the illustrated embodiment, the fluid flow rate to the lower actuator 66 may control the position of the cylinder control valve 46, thereby controlling the flow rate of fluid from the fluid source to the rod end 54 of the actuator 22, which may control the rate at which the actuator 22 lowers the ground engaging tools relative to the soil surface.

The operator may engage the manual control mode to facilitate manual control of the position of the ground engaging tools relative to the soil surface. Engagement of the manual control mode automatically disengages the automatic control mode disclosed above. As discussed in detail below, the manual control mode may be engaged by moving the manual control valve 38 to a raise position. Furthermore, in certain embodiments, the manual control mode may be engaged via the user interface 134 (e.g., by actuating a control within the user interface 134).

While the automatic control mode is active, the operator may engage the manual control mode by moving the manual control valve 38 to the raise position, thereby providing fluid to the first manual control conduit 74 via the first inlet 70. As fluid flows into the first manual control conduit 74, fluid pressure within the first manual control conduit 74 increases. The pressure sensor 126, which is fluidly coupled to the first manual control conduit 74, outputs a signal indicative of the pressure within the first manual control conduit 74. The controller 124 receives the signal from the pressure sensor 126, and the controller 124 engages the manual control mode/disengages the automatic control mode in response to the pressure within the first manual control conduit 74 exceeding a threshold pressure. Accordingly, the controller 124 instructs the automatic control valve assembly 78 to block fluid flow from the supply conduit 42 to the raise actuator 64 and the lower actuator 66 of the cylinder control valve 46. For example, the controller 124 may instruct the actuator 88 of the raise control valve 80 to enable the biasing element 90 and the pilot line 92 to drive the raise control valve 80 to the first position 84. In addition, the controller 124 may instruct the actuator 122 of the selection control valve 114 to enable the biasing member 123 to drive the selection control valve 114 to the first position 116. Furthermore, the controller 124 may instruct the actuator 98 of the lower control valve 82 to enable the biasing element 100 and the pilot line 102 to drive the lower control valve 82 to the first position 94.

With the raise control valve 80 in the first position 84, fluid flow from the supply conduit 42 to the shuttle valve 104 is blocked, and fluid flow from the shuttle valve 104 to the return conduit 44 is enabled. Accordingly, fluid drains from the raise control conduit 110, which causes the pressure within the first manual control conduit 74 to move the shuttle valve to a position that facilities fluid flow from the first manual control conduit 74 to the raise actuator and blocks fluid flow between the raise control valve 80 and the raise actuator 64. In addition, with the selection control valve 114 in the first position 116, fluid flow between the lower control valve 82 and the lower actuator 66 is blocked, and fluid flow between the second manual control conduit 76 and the lower actuator 66 is enabled. With the manual control valve 38 in the raise position, the manual control valve 38 enables fluid from the second manual control conduit 76 to drain to a reservoir. In addition, fluid within the second manual control conduit 76 may drain to the reservoir through the second drain conduit 79.

With the manual control valve 38 in the raise position, fluid flows from the manual control valve 38 to the raise actuator 64 of the cylinder control valve 46 via the first manual control conduit 74 and the shuttle valve 104. In addition, fluid drains from the lower actuator 66 of the cylinder control valve 46 to the reservoir(s) via the selection control valve 114, the second manual control conduit 76, and the second drain conduit 79. Accordingly, the fluid flow from the manual control valve 38 causes the raise actuator 64 to drive the cylinder control valve 46 to the second position 60 (e.g., with the lower actuator 66 providing substantially no resistance to movement of the cylinder control valve 46 because the fluid within the lower actuator 66 is able to drain to the reservoir(s)). As a result, fluid flows to the cap end 52 of the actuator 22, which causes the actuator 22 to raise the ground engaging tools relative to the soil surface. Because the manual control valve 38 is a proportional control valve in the illustrated embodiment, the operator may control the fluid flow rate to the raise actuator 64. In addition, because the cylinder control valve 46 is a proportional control valve in the illustrated embodiment, the fluid flow rate to the raise actuator 64 may control the position of the cylinder control valve 46, thereby controlling the flow rate of fluid from the fluid source to the cap end 52 of the actuator 22, which may control the rate at which the actuator 22 raises the ground engaging tools relative to the soil surface.

To lower the ground engaging tools relative to the soil surface, the operator may move the manual control valve 38 to the lower position. With the manual control valve 38 in the lower position, fluid flows from the manual control valve 38 to the second manual control conduit 76 via the second inlet 72, and fluid flows from the first manual control conduit 74 to a reservoir via the first inlet 70. With the selection control valve 114 in the first position 116, flow from the second manual control conduit 76 flows to the lower actuator 66. In addition, fluid from the raise actuator 64 flows through the shuttle valve 104 to the first manual control conduit 74 and to the reservoir via the first drain conduit 75.

Accordingly, with the manual control valve 38 in the lower position, fluid flows from the manual control valve 38 to the lower actuator 66 of the cylinder control valve 46 via the second manual control conduit 76 and the selection control valve 114. In addition, fluid drains from the raise actuator 66 of the cylinder control valve 46 to the reservoir(s) via the shuttle valve 104, the first manual control conduit 74, and the first drain conduit 75. Accordingly, the fluid flow from the manual control valve 38 causes the lower actuator 66 to drive the cylinder control valve 46 to the third position 62 (e.g., with the raise actuator 64 providing substantially no resistance to movement of the cylinder control valve 46 because the fluid within the raise actuator 64 is able to drain to the reservoir(s)). As a result, fluid flows from the fluid source to the rod end 54 of the actuator 22, which causes the actuator 22 to lower the ground engaging tools relative to the soil surface. Because the manual control valve 38 is a proportional control valve in the illustrated embodiment, the operator may control the fluid flow rate to the lower actuator 66. In addition, because the cylinder control valve 46 is a proportional control valve in the illustrated embodiment, the fluid flow rate to the lower actuator 66 may control the position of the cylinder control valve 46, thereby controlling the flow rate of fluid from the fluid source to the rod end 54 of the actuator 22, which may control the rate at which the actuator 22 lowers the ground engaging tools relative to the soil surface.

The controller 124 may automatically reactivate the automatic control mode/deactivate the manual control mode in response to determining that the position of the ground engaging tools is within a threshold distance from a target ground engaging tool position. For example, as previously discussed, the operator may input a target ground engaging tool position to controller 124 via the user interface 134 (e.g., the operator may input a target position of the ground engaging tools relative to the soil surface using an input device of the user interface 134). The operator may also input the threshold distance via the user interface 134, or the threshold distance may be determined by the controller 124 (e.g., based on the type of implement, the type(s) of ground engaging tool, the type of soil, the type of crops to be planted after tillage operations, soil conditions, etc.). By way of example, the threshold distance may be about 0 inches to about 3 inches (e.g., about 0 cm to about 7.62 cm), about 0.25 inches to about 1.5 inches (e.g., about 0.635 cm to about 3.81 cm), about 0.5 inches to about 1 inch (e.g., about 1.27 cm to about 2.54 cm), or about 0.5 inches (e.g., about 1.27 cm).

If the position of the ground engaging tools is within the threshold range of the target ground engaging tool position, the controller 124 may activate the automatic control mode by instructing the actuator 122 of the selection control valve 114 to move the selection control valve 114 to the second position 118 and instructing the actuator 98 of the lower control valve 82 to move the lower control valve 82 to the second position 96. With the selection control valve 114 in the second position 118, fluid flow from the second manual control conduit 76 to the lower actuator 66 of the cylinder control valve 46 is blocked, thereby disabling manual lowering control using the manual control valve 38. In addition, with the selection control valve 114 in the second position 118, a fluid connection between the lower control valve 82 and the lower actuator 66 of the cylinder control valve 146 is established. Accordingly, the controller 124 may control lowering of the ground engaging tools by outputting instructions to the actuator 98 of the lower control valve 82. For example, the controller 124 may instruct the automatic control valve assembly 78 to move the ground engaging tools to the target position. Automatically reactivating the automatic control mode/deactivating the manual control mode in response to determining that the position of the ground engaging tools is within the threshold distance from the target ground engaging tool position may substantially reduce or eliminate the possibility of the ground engaging tools penetrating the soil at an undesirable depth.

The automatic control mode may also be activated by moving the manual control valve 38 to the neutral position and instructing, via the user interface 134, the controller 124 to engage automatic control. For example, an operator may raise the ground engaging tools above the target position during a turn between sequential rows in a field by moving the manual control valve 38 to the raise position, which engages the manual control mode/disengages the automatic control mode. The operator may then move the manual control valve 38 to the neutral position and instruct the controller 124 to reactivate the automatic control mode by providing input to the user interface 134. The controller 124 may determine whether the manual control valve 38 is in the neutral position by comparing the pressure within the first manual control conduit 74 (e.g., as determined based on feedback from the pressure sensor 126) to a threshold pressure associated with the manual control valve 38 being in the neutral position or the lower position. The controller 124 may also determine whether the position of the ground engaging tools relative to the soil surface is substantially constant (e.g., based on feedback from the position sensor 128). If the position of the ground engaging tools relative to the soil surface is substantially constant and the fluid pressure within the first manual control conduit 74 is below the threshold pressure, the controller 124 may determine that the manual control valve 38 is in the neutral position. Upon determining that the manual control valve 38 is in the neutral position and receiving instructions (e.g., from the user interface 134) indicative of activation of the automatic control mode, the controller 124 may activate the automatic control mode (e.g., control the automatic control valve assembly 78 to position the ground engaging tools at the target position).

Because each of the raise control valve 80, the lower control valve 82, and the selection control valve 114 includes a respective biasing element configured to drive the valve to the respective first position, the valves may move to the respective first positions in response to a loss of electrical power (e.g., which deactivates each valve actuator). As previously discussed, with the raise control valve 80, the lower control valve 82, and the selection control valve 114 in the respective first positions, fluid flow from the supply conduit 42 to the raise actuator 64 and the lower actuator 66 of the cylinder control valve 46 is blocked, and fluid flow from the manual control valve to the raise actuator 64 and the lower actuator 66 of the cylinder control valve 46 is enabled. Accordingly, if electrical power to the valve actuators is interrupted, manual control of the cylinder control valve 46 is automatically enabled, thereby enabling manual control of the actuator 22.

While the automatic control valve assembly 78 includes the selection control valve 114, the shuttle valve 104, the raise control valve 80, and the lower control valve 82 in the illustrated embodiment, in other embodiments, the automatic control valve assembly may include other and/or additional valves. For example, in certain embodiments, the shuttle valve may be replaced with a selection control valve that may be controlled based on the pressure differential between the first manual control conduit and the raise control conduit. Furthermore, in certain embodiments, at least one valve may be actuated using a different suitable actuation system. For example, the pilot line of at least one control valve may be omitted. In addition, while the implement control system described above is driven by hydraulic fluid, in other embodiments, the implement control system may be driven by air (e.g., a pneumatic system) or another suitable fluid.

Figure 3:
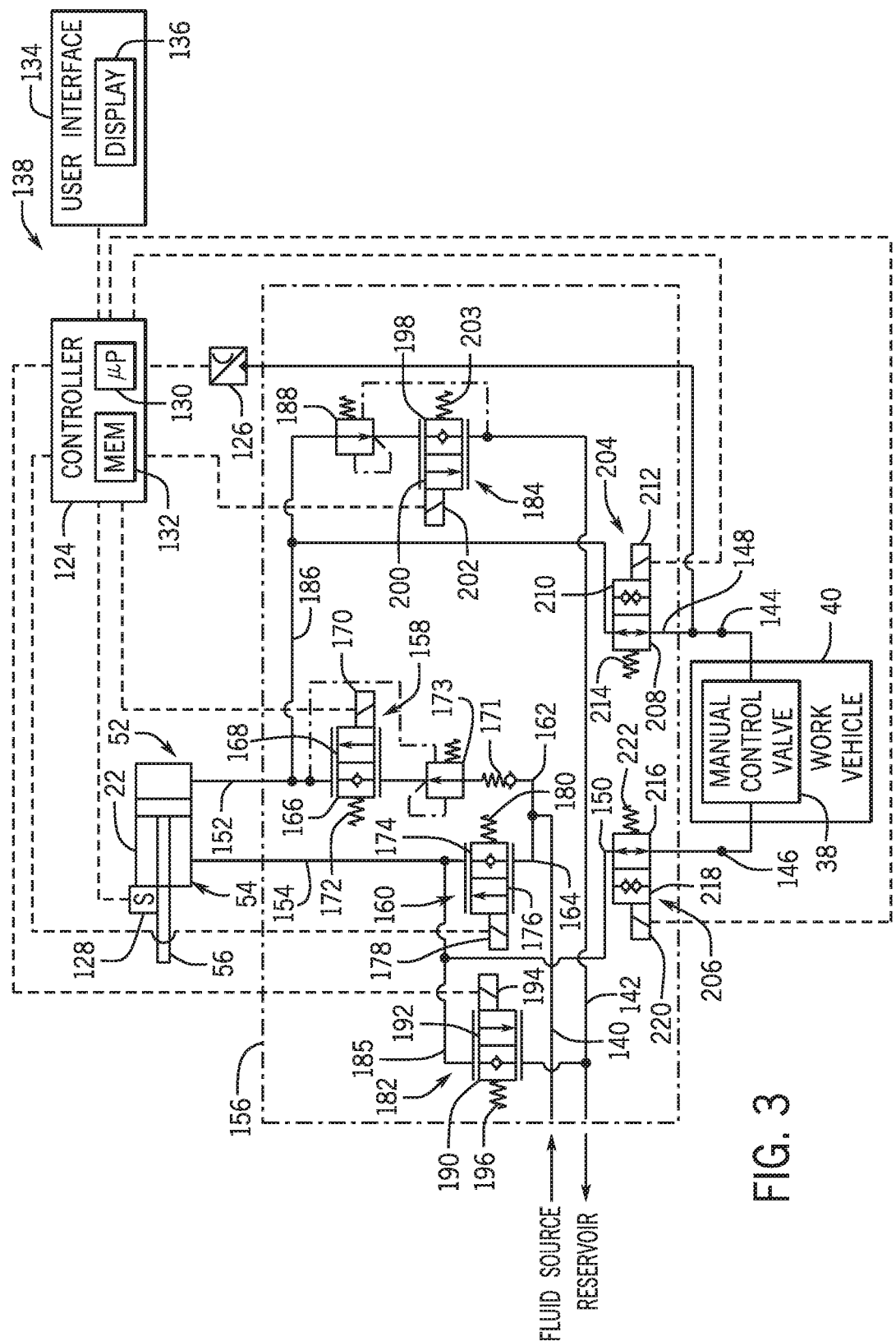
FIG. 3 is a schematic diagram of another embodiment of an implement control system that may be employed within the agricultural implement of FIG. 1.

FIG. 3 is a schematic diagram of another embodiment of an implement control system 138 that may be employed within the agricultural implement of FIG. 1. In the illustrated embodiment, the implement control system 138 includes a supply conduit 140 configured to receive fluid (e.g., hydraulic fluid) from a fluid source. The implement control system 138 also includes a return conduit 142 configured to output fluid to a reservoir. The fluid source may include a pump (e.g., hydraulic pump) disposed on the work vehicle 40, and the reservoir may include a tank (e.g., hydraulic fluid tank) disposed on the work vehicle 40. The pump may be fluidly coupled to the tank, thereby circulating hydraulic fluid through the implement control system 138.

Furthermore, the implement control system 138 includes a first inlet 144 configured to fluidly couple to the manual control valve 38, and a second inlet 146 configured to fluidly couple to the manual control valve 38. The implement control system 138 also includes a first manual control conduit 148 configured to establish a fluid connection between the first inlet 144 and the cap end 52 (e.g., first end) of the actuator 22 (e.g., hydraulic cylinder). In addition, the implement control system 138 includes a second manual control conduit 150 configured to establish a fluid connection between the second inlet 146 and the rod end 54 (e.g., second end) of the actuator 22. In the illustrated embodiment, the first manual control conduit 148 is fluidly coupled to the cap end 52 of the actuator 22 via a first cylinder conduit 152, and the second manual control conduit 150 is fluidly coupled to the rod end 54 of the actuator 22 via a second cylinder conduit 154.

As previously discussed, providing fluid to the cap end 52 of the actuator 22 drives the piston rod 56 to extend, and providing fluid to the rod end 54 of the actuator 22 drives the piston rod 56 to retract. In the illustrated embodiment, extension of the piston rod 56 drives the ground engaging tools of the implement upwardly relative to the soil surface (e.g., by driving the wheels of the implement downwardly relative to the implement frame), and retraction of the piston rod 56 drives the ground engaging tools of the implement downwardly relative to the soil surface (e.g., by driving the wheels of the implement upwardly relative to the implement frame). However, in other embodiments, extension of the piston rod may drive the ground engaging tools downwardly relative to the soil surface, and retraction of the piston rod may drive the ground engaging tools upwardly relative to the soil surface. In such embodiments, the first cylinder conduit 152 may be fluidly coupled to the rod end (e.g., first end) of the actuator, and the second cylinder conduit 154 may be coupled to the cap end (e.g., second end) of the actuator. Furthermore, in certain embodiments, multiple actuators may be utilized to control the position of the ground engaging tools relative to the soil surface. In such embodiments, the actuators may be fluidly coupled to one another in a series arrangement, in a parallel arrangement, in another suitable arrangement, or a combination thereof.

The manual control valve 38 to configured to transition between a raise position, a lower position, and a neutral position. While the manual control valve 38 is in the raise position, the manual control valve 38 facilitates fluid flow from a fluid source (e.g., the same fluid source that provides fluid to the supply conduit 140) to the first inlet 144 and facilitates fluid flow from the second inlet 146 to a reservoir (e.g., the same reservoir that receives fluid from the return conduit 142), thereby driving the actuator 22 to raise the ground engaging tools relative to the soil surface. Furthermore, while the manual control valve 38 is in the lower position, the manual control valve 38 facilitates fluid flow from the fluid source to the second inlet 146 and facilitates fluid flow from the first inlet 144 to the reservoir, thereby driving the actuator 22 to lower the ground engaging tools relative to the soil surface. In addition, while the manual control valve 38 is in the neutral position, the manual control valve 38 blocks fluid flow between the fluid source and the inlets and between the reservoir and the inlets, thereby causing the actuator 22 to maintain the position of the ground engaging tools relative to the soil surface. The manual control valve 38 may include a lever or other suitable actuator configured to enable an operator (e.g., positioned within a cab of the work vehicle 40) to move the manual control valve 38 between the raise, lower, and neutral positions. Accordingly, the operator may manually control the position of the ground engaging tools relative to the soil surface by providing input to the manual control valve 38.

In the illustrated embodiment, the implement control system 138 includes an automatic control valve assembly 156 configured to control the actuator 22 while an automatic control mode is active. As discussed in detail below, the automatic control valve assembly 156 is fluidly coupled to the supply conduit 140, the return conduit 142, the rod end 52 of the actuator 22, and the cap end 54 of the actuator 22. The automatic control valve assembly 156 is configured to provide fluid flow from the supply conduit 140 to the cap end 52 of the actuator 22 to cause the actuator 22 to raise the ground engaging tools relative to the soil surface. In addition, the automatic control valve assembly 156 is configured to provide fluid flow from the supply conduit 140 to the rod end 54 of the actuator 22 to cause the actuator 22 to lower the ground engaging tools relative to the soil surface.

In the illustrated embodiment, the automatic control valve assembly 156 includes two meter-in valves, i.e., a raise control valve 158 and a lower control valve 160. The raise control valve 158 is configured to control fluid flow from the supply conduit 140 to the cap end 52 of the actuator 22. As illustrated, the raise control valve 158 is fluidly coupled to the first cylinder conduit 152, which is fluidly coupled to the cap end 52 of the actuator 22, and to a raise supply conduit 162, which is fluidly coupled to the supply conduit 140. In addition, the lower control valve 160 is configured to control fluid flow from the supply conduit 140 to the rod end 54 of the actuator 22. As illustrated, the lower control valve 160 is fluidly coupled to the second cylinder conduit 154, which is fluidly coupled to the rod end 54 of the actuator 22, and to a lower supply conduit 164, which is fluidly coupled to the supply conduit 140.

In the illustrated embodiment, the raise control valve 158 is a proportional two position/two way valve. The first position 166 is configured to block fluid flow from the raise supply conduit 162 to the first cylinder conduit 152, thereby blocking fluid flow from the supply conduit 140 to the cap end 52 of the actuator 22. In addition, the second position 168 is configured to facilitate fluid flow from the raise supply conduit 162 to the first cylinder conduit 152, thereby facilitating fluid flow from the supply conduit 140 to the cap end 52 of the actuator 22. Furthermore, the raise control valve 158 includes an actuator 170 (e.g., solenoid, etc.) configured to drive the raise control valve 158 from the first position 166 to the second position 168. The raise control valve 158 also includes a biasing element 172 (e.g., spring, etc.) configured to urge the raise control valve 158 toward the first position 166. In the illustrated embodiment, the raise control valve 158 is a proportional control valve configured to control the fluid flow rate through the valve (e.g., based on the position of the valve relative to the first position). However, in other embodiments, the raise control valve may be another suitable type of valve configured to control fluid flow between the supply conduit 140 and the cap end 52 of the actuator 22.

In the illustrated embodiment, a check valve 171 is disposed along the raise supply conduit 162 and configured to block fluid flow from first cylinder conduit 152 to the supply conduit 140 (e.g., while fluid is being supplied to the first cylinder conduit 152 from the manual control valve 38 during manual control of the actuator 22). In addition, a pressure compensator 173 is disposed along the raise supply conduit and configured to control fluid pressure across the raise control valve 158 (e.g., to establish a substantially constant pressure drop across the raise control valve 158 regardless of the upstream supply pressure and the downstream load pressure). However, in other embodiments, at least one of the check valve and the pressure compensator may be omitted (e.g., and replaced with another suitable valve/valve assembly).

Furthermore, the lower control valve 160 is a proportional two position/two way valve. The first position 174 is configured to block fluid flow from the lower supply conduit 164 to the second cylinder conduit 154, thereby blocking fluid flow from the supply conduit 140 to the rod end 54 of the actuator 22. In addition, the second position 176 is configured to facilitate fluid flow from the lower supply conduit 164 to the second cylinder conduit 154, thereby facilitating fluid flow from the supply conduit 140 to the rod end 54 of the actuator 22. Furthermore, the lower control valve 160 includes an actuator 178 (e.g., solenoid, etc.) configured to drive the lower control valve 160 from the first position 174 to the second position 176. The lower control valve 160 also includes a biasing element 180 (e.g., spring, etc.) configured to urge the lower control valve 160 toward the first position 174. In the illustrated embodiment, the lower control valve 160 is a proportional control valve configured to control the fluid flow rate through the valve (e.g., based on the position of the valve relative to the first position). However, in other embodiments, the lower control valve may be another suitable type of valve configured to control fluid flow between the supply conduit 140 and the rod end 54 of the actuator 22.

In the illustrated embodiment, the automatic control valve assembly 156 includes two meter-out valves, i.e., a raise return valve 182 and a lower return valve 184. The raise return valve 182 is configured to selectively facilitate fluid flow from the rod end 54 of the actuator 22 to the return conduit 142 while the raise control valve 158 is active (e.g., while the actuator 170 of the raise control valve 158 is activated, while the raise control valve 158 is in the second position 168, etc.). As illustrated, the raise return valve 182 is fluidly coupled to the second cylinder conduit 154 via a first connecting conduit 185 and to the return conduit 142. As previously discussed, the second cylinder conduit 154 is fluidly coupled to the rod end 54 of the actuator 22. In addition, the lower return valve 184 is configured to selectively facilitate fluid flow from the cap end 52 of the actuator 22 to the return conduit 142 while the lower control valve 160 is active (e.g., while the actuator 178 of the lower control valve 160 is activated, while the lower control valve 160 is in the second position 176, etc.). As illustrated, the lower return valve 184 is fluidly coupled to the first cylinder conduit 152 via a second connecting conduit 186 and to the return conduit 142. As previously discussed, the first cylinder conduit 152 is fluidly coupled to the cap end 52 of the actuator 22. In the illustrated embodiment, a pressure compensator 188 is disposed along the second connecting conduit 186 and configured to control fluid pressure across the lower return valve 184 (e.g., to establish a substantially constant pressure drop across the lower return valve 184 regardless of the upstream supply pressure and the downstream load pressure). However, in other embodiments, the pressure regulator may be omitted (e.g., and replaced with another suitable valve/valve assembly).

In the illustrated embodiment, the raise return valve 182 is a proportional two position/two way valve. The first position 190 is configured to block fluid flow from the first connecting conduit 185/second cylinder conduit 154 to the return conduit 142, thereby blocking fluid flow from the rod end 54 of the actuator 22 to the return conduit 142. In addition, the second position 192 is configured to facilitate fluid flow from the first connecting conduit 185/second cylinder conduit 154 to the return conduit 142, thereby facilitating fluid flow from the rod end 54 of the actuator 22 to the return conduit 142. Furthermore, the raise return valve 182 includes an actuator 194 (e.g., solenoid, etc.) configured to drive the raise return valve 182 from the first position 190 to the second position 192. The raise return valve 182 also includes a biasing element 196 (e.g., spring, etc.) configured to urge the raise return valve 182 toward the first position 190. In the illustrated embodiment, the raise return valve 182 is a proportional control valve configured to control the fluid flow rate through the valve (e.g., based on the position of the valve relative to the first position). However, in other embodiments, the raise return valve may be another suitable type of valve configured to control fluid flow from the rod end 54 of the actuator 22 to the return conduit 142.

In the illustrated embodiment, the lower return valve 184 is a proportional two position/two way valve. The first position 198 is configured to block fluid flow from the second connecting conduit 186/first cylinder conduit 152 to the return conduit 142, thereby blocking fluid flow from the cap end 52 of the actuator 22 to the return conduit 142. In addition, the second position 200 is configured to facilitate fluid flow from the second connecting conduit 186/first cylinder conduit 152 to the return conduit 142, thereby facilitating fluid flow from the cap end 52 of the actuator 22 to the return conduit 142. Furthermore, the lower return valve 184 includes an actuator 202 (e.g., solenoid, etc.) configured to drive the lower return valve 184 from the first position 198 to the second position 200. The lower return valve 184 also includes a biasing element 203 (e.g., spring, etc.) configured to urge the lower return valve 184 toward the first position 198. In the illustrated embodiment, the lower return valve 184 is a proportional control valve configured to control the fluid flow rate through the valve (e.g., based on the position of the valve relative to the first position). However, in other embodiments, the lower return valve may be another suitable type of valve configured to control fluid flow from the cap end 52 of the actuator 22 to the return conduit 142.

Furthermore, in the illustrated embodiment, the automatic control valve assembly 156 includes a manual raise valve 204 and a manual lower valve 206. The manual raise valve 204 is fluidly coupled to the first manual control conduit 148 (e.g., disposed along the first manual control conduit 148), and the manual lower valve 206 is fluidly coupled to the second manual control conduit 150 (e.g., disposed along the second manual control conduit 150). The manual raise/lower valves are configured to selectively block fluid flow through the first manual control conduit 148 and the second manual control conduit 150 while the automatic control mode is active, thereby disabling control of the actuator 22 by the manual control valve 38.

In the illustrated embodiment, the manual raise valve 204 is a two position/two way valve. The first position 208 is configured to facilitate fluid flow from the manual control valve 38 to the second connecting conduit 186/first cylinder conduit 152, thereby facilitating fluid flow from the manual control valve 38 to the cap end 52 of the actuator 22. In addition, the second position 210 is configured to block fluid flow from the manual control valve 38 to the second connecting conduit 186/first cylinder conduit 152, thereby blocking fluid flow from the manual control valve 38 to the cap end 52 of the actuator 22. Furthermore, the manual raise valve 204 includes an actuator 212 (e.g., solenoid, etc.) configured to drive the manual raise valve 204 from the first position 208 to the second position 210. The manual raise valve 204 also includes a biasing element 214 (e.g., spring, etc.) configured to urge the manual raise valve 204 toward the first position 208.

In the illustrated embodiment, the manual lower valve 206 is a two position/two way valve. The first position 216 is configured to facilitate fluid flow from the manual control valve 38 to the first connecting conduit 185/second cylinder conduit 154, thereby facilitating fluid flow from the manual control valve 38 to the rod end 54 of the actuator 22. In addition, the second position 218 is configured to block fluid flow from the manual control valve 38 to the first connecting conduit 185/second cylinder conduit 154, thereby blocking fluid flow from the manual control valve 38 to the rod end 54 of the actuator 22. Furthermore, the manual lower valve 206 includes an actuator 220 (e.g., solenoid, etc.) configured to drive the manual lower valve 206 from the first position 216 to the second position 218. The manual lower valve 206 also includes a biasing element 222 (e.g., spring, etc.) configured to urge the manual lower valve 206 toward the first position 216.

In the illustrated embodiment, the pressure sensor 126 is fluidly coupled to the first manual control conduit 148 and configured to output a signal indicative of a fluid pressure within the first manual control conduit 148. In addition, the controller 124 is communicatively coupled to the pressure sensor 126 and the position sensor 128. The controller 124 is also communicatively coupled to the automatic control valve assembly 156. As illustrated, the controller 124 is communicatively coupled to the actuator 170 of the raise control valve 158, to the actuator 178 of the lower control valve 160, to the actuator 194 of the raise return valve 182, to the actuator 202 of the lower return valve 184, to the actuator 212 of the manual raise valve 204, and to the actuator 220 of the manual lower valve 206 of the automatic control valve assembly 156. As discussed in detail below, the controller 124 is configured to control the automatic control valve assembly 156 based on the position of the ground engaging tools relative to the soil surface while the automatic control mode is active, and the controller 124 is configured to deactivate the automatic control mode and to instruct the automatic control valve assembly 156 to block fluid flow from the supply conduit to the actuator 22 in response to the fluid pressure within the first manual control conduit 148 exceeding a threshold pressure.

The controller 124 is configured to control the automatic control valve assembly 156 while the implement control system 138 is in an automatic control mode. For example, an operator may input a target position of the ground engaging tools relative to the soil surface into the user interface 134, and the operator may engage the automatic control mode via the user interface 134. The user interface 134, in turn, may output signal(s) to the controller 124 indicative of the target position and activation of the automatic control mode. The controller 124 may then output instructions to the automatic control valve assembly 156 to raise or lower the ground engaging tools based on the current position of the ground engaging tools (e.g., which may be determined based on feedback from the position sensor 128) and the target position of the ground engaging tools.

Upon activation of the automatic control mode, the controller 124 may instruct the manual raise valve 204 and the manual lower valve 206 to block fluid flow through the first manual control conduit 148 and the second manual control conduit 150. For example, the controller 124 may instruct the actuator 212 of the manual raise valve 204 to drive the manual raise valve 204 to the second position 210. With the manual raise valve 204 in the second position 210, fluid flow from the manual control valve 38 to the cap end 52 of the actuator 22 is blocked. In addition, the controller 124 may instruct the actuator 220 of the manual lower valve 206 to drive the manual lower valve 206 to the second position 218. With the manual lower valve 206 in the second position 218, fluid flow from the manual control valve 38 to the rod end 54 of the actuator 22 is blocked.

If the current position of the ground engaging tools is lower than the target position, the controller 124 may instruct the automatic control valve assembly 156 to raise the ground engaging tools. For example, the controller 124 may instruct the actuator 170 of the raise control valve 158 to drive the raise control valve 158 toward the second position 168. As previously discussed, the second position 168 of the raise control valve 158 is configured to facilitate fluid flow from the supply conduit 140 to the cap end 52 of the actuator 22 (e.g., via the raise supply conduit 162 and the first cylinder conduit 152). In addition, the controller 124 may instruct the actuator 194 of the raise return valve 182 to drive the raise return valve 182 toward the second position 192. As previously discussed, the second position 192 of the raise return valve 182 is configured to facilitate fluid flow from the rod end 54 of the actuator 22 to the return conduit 142 (e.g., via the second cylinder conduit 154 and the first connecting conduit 185). Furthermore, the controller 124 may instruct the actuator 178 of the lower control valve 160 to enable the biasing element 180 to drive the lower control valve 160 to the first position 174. As previously discussed, the first position 174 of the lower control valve 160 is configured to block fluid flow from the supply conduit 140 to the rod end 54 of the actuator 22. The controller 124 may also instruct the actuator 202 of the lower return valve 184 to enable the biasing element 203 to drive the lower return valve 184 to the first position 198. As previously discussed, the first position 198 of the lower return valve 184 is configured to block fluid flow from the cap end 52 of the actuator 22 to the return conduit 142.

Accordingly, with the raise control valve 158 in the second position 168, the raise return valve 182 in the second position 192, the lower control valve 160 in the first position 174, and the lower return valve 184 in the first position 198, a fluid connection is established between the supply conduit 140 and the cap end 52 of the actuator 22 and between the return conduit 142 and the rod end 54 of the actuator 22. As a result, the piston rod 56 of the actuator 22 is driven to extend, thereby raising the ground engaging tools relative to the soil surface. Because the raise control valve 158 is a proportional control valve in the illustrated embodiment, the controller 124 may control the fluid flow rate from the fluid source to the cap end 52 of the actuator 22. In addition, because the raise return valve 182 is a proportional control valve in the illustrated embodiment, the controller 124 may control the fluid flow rate from the rod end 54 of the actuator 22 to the return conduit 142. Accordingly, the controller 124 may control the rate at which the actuator 22 raises the ground engaging tools relative to the soil surface.

If the current position of the ground engaging tools is higher than the target position, the controller 124 may instruct the automatic control valve assembly 156 to lower the ground engaging tools. For example, the controller 124 may instruct the actuator 178 of the lower control valve 160 to drive the lower control valve 160 toward the second position 176. As previously discussed, the second position 176 of the lower control valve 160 is configured to facilitate fluid flow from the supply conduit 140 to the rod end 54 of the actuator 22 (e.g., via the lower supply conduit 164 and the second cylinder conduit 154). In addition, the controller 124 may instruct the actuator 202 of the lower return valve 184 to drive the lower return valve 184 toward the second position 200. As previously discussed, the second position 200 of the lower return valve 184 is configured to facilitate fluid flow from the cap end 52 of the actuator 22 to the return conduit 142 (e.g., via the first cylinder conduit 152 and the second connecting conduit 186). Furthermore, the controller 124 may instruct the actuator 170 of the raise control valve 158 to enable the biasing element 172 to drive the raise control valve 158 to the first position 166. As previously discussed, the first position 166 of the raise control valve 158 is configured to block fluid flow from the supply conduit 140 to the cap end 52 of the actuator 22. The controller 124 may also instruct the actuator 194 of the raise return valve 182 to enable the biasing element 196 to drive the raise return valve 182 to the first position 190. As previously discussed, the first position 190 of the raise return valve 182 is configured to block fluid flow from the rod end 54 of the actuator 22 to the return conduit 142.

Accordingly, with the lower control valve 160 in the second position 176, the lower return valve 184 in the second position 200, the raise control valve 158 in the first position 166, and the raise return valve 182 in the first position 190, a fluid connection is established between the supply conduit 140 and the rod end 54 of the actuator 22 and between the return conduit 142 and the cap end 52 of the actuator 22. As a result, the piston rod 56 of the actuator 22 is driven to retract (e.g., via the fluid pressure differential within the actuator 22 and/or via the weight of the ground engaging tools, implement frame, etc.), thereby lowering the ground engaging tools relative to the soil surface. Because the lower control valve 160 is a proportional control valve in the illustrated embodiment, the controller 124 may control the fluid flow rate from the fluid source to the rod end 54 of the actuator 22. In addition, because the lower return valve 184 is a proportional control valve in the illustrated embodiment, the controller 124 may control the fluid flow rate from the cap end 52 of the actuator 22 to the return conduit 142. Accordingly, the controller 124 may control the rate at which the actuator 22 lowers the ground engaging tools relative to the soil surface.

The operator may engage the manual control mode to facilitate manual control of the position of the ground engaging tools relative to the soil surface. Engagement of the manual control mode automatically disengages the automatic control mode disclosed above. As discussed in detail below, the manual control mode may be engaged by moving the manual control valve 38 to a raise position. Furthermore, in certain embodiments, the manual control mode may be engaged via the user interface 134 (e.g., by actuating a control within the user interface 134).

While the automatic control mode is active, the operator may engage the manual control mode by moving the manual control valve 38 to the raise position, thereby providing fluid to the first manual control conduit 148 via the first inlet 144. As fluid flows into the first manual control conduit 148, fluid pressure within the first manual control conduit 148 increases (e.g., at least because the manual raise valve 204 is in the second position 210 while the automatic control mode is active). The pressure sensor 126, which is fluidly coupled to the first manual control conduit 148, outputs a signal indicative of the pressure within the first manual control conduit 148. The controller 124 receives the signal from the pressure sensor 126, and the controller 124 engages the manual control mode/disengages the automatic control mode in response to the pressure within the first manual control conduit 148 exceeding a threshold pressure. Accordingly, the controller 124 instructs the automatic control valve assembly 156 to block fluid flow from the supply conduit 140 to the actuator 22. For example, the controller 124 may instruct the actuator 170 of the raise control valve 158 to enable the biasing element 172 to drive the raise control valve 158 to the first position 166. In addition, the controller 124 may instruct the actuator 178 of the lower control valve 160 to enable the biasing element 180 to drive the lower control valve 160 to the first position 174. Furthermore, the controller 124 may instruct the actuator 194 of the raise return valve 182 to enable the biasing element 196 to drive the raise return valve 182 to the first position 190. The controller 124 may also instruct the actuator 202 of the lower return valve 184 to drive the lower return valve 184 to the first position 198.

With the raise control valve 158 in the first position 166, fluid flow from the supply conduit 140 to the cap end 52 of the actuator 22 is blocked. In addition, with the raise return valve 182 in the first position 190, fluid flow from the rod end 54 of the actuator 22 to the return conduit 142 is blocked. Furthermore, with the lower control valve 160 in the first position 174, fluid flow from the supply conduit 140 to the rod end 54 of the actuator 22 is blocked. And, with the lower return valve 184 in the first position 198, fluid flow from the cap end 52 of the actuator 22 to the return conduit 142 is blocked. Accordingly, fluid flow between the supply and return conduits and the actuator is blocked.

Furthermore, upon activation of the manual control mode/deactivation of the automatic control mode, the controller 124 may instruct the manual raise valve 204 and the manual lower valve 206 to facilitate fluid flow through the first manual control conduit 148 and the second manual control conduit 150. For example, the controller 124 may instruct the actuator 212 of the manual raise valve 204 to enable the biasing element 214 to drive the manual raise valve 204 to the first position 208. With the manual raise valve 204 in the first position 208, fluid flow between the manual control valve 38 and the cap end 52 of the actuator 22 is enabled. In addition, the controller 124 may instruct the actuator 220 of the manual lower valve 206 to enable the biasing element 222 to drive the manual lower valve 206 to the first position 216. With the manual lower valve 206 in the first position 216, fluid flow between the manual control valve 38 and the rod end 54 of the actuator 22 is enabled.

With the manual control valve 38 in the raise position, fluid flows from the manual control valve 38 to the cap end 52 of the actuator 22 via the manual raise valve 204, the second connecting conduit 186, and the first cylinder conduit 152. In addition, fluid drains from the rod end 54 of the actuator 22 to the manual control valve 38 via the second cylinder conduit 154, the first connecting conduit 185, and the manual lower valve 206. Accordingly, the piston rod 56 of the actuator 22 is driven to extend, which drives the ground engaging tools to raise relative to the soil surface. Because the manual control valve 38 is a proportional control valve in the illustrated embodiment, the operator may control the fluid flow rate to the cap end 52 of the actuator 22 and the fluid flow rate from the rod end 54 of the actuator 22, thereby controlling the rate at which the actuator 22 raises the ground engaging tools relative to the soil surface.

To lower the ground engaging tools relative to the soil surface, the operator may move the manual control valve 38 to the lower position. With the manual control valve 38 in the lower position, fluid flows from the manual control valve 38 to the rod end 54 of the actuator 22 via the manual lower valve 206, the first connecting conduit 185, and the second cylinder conduit 154. In addition, fluid drains from the cap end 52 of the actuator 22 to the manual control valve 38 via the first cylinder conduit 152, the second connecting conduit 186, and the manual raise valve 204. Accordingly, the piston rod 56 of the actuator 22 is driven to retract (e.g., via the fluid pressure differential within the actuator 22 and/or via the weight of the ground engaging tools, implement frame, etc.), which lowers the ground engaging tools relative to the soil surface. Because the manual control valve 38 is a proportional control valve in the illustrated embodiment, the operator may control the fluid flow rate to the rod end 54 of the actuator 22 and the fluid flow rate from the cap end 52 of the actuator 22, thereby controlling the rate at which the actuator 22 lowers the ground engaging tools relative to the soil surface.

The controller 124 may automatically reactivate the automatic control mode/deactivate the manual control mode in response to determining that the position of the ground engaging tools is within a threshold distance from a target ground engaging tool position. For example, as previously discussed, the operator may input a target ground engaging tool position into the controller 124 via the user interface 134 (e.g., the operator may input a target position of the ground engaging tools relative to the soil surface using an input device of the user interface 134). The operator may also input the threshold distance via the user interface 134, or the threshold distance may be determined by the controller 124 (e.g., based on the type of implement, the type of ground engaging tool(s), the type of soil, the type of crops to be planted after tillage operations, etc.). By way of example, the threshold distance may be about 0 inches to about 3 inches (e.g., about 0 cm to about 7.62 cm), about 0.25 inches to about 1.5 inches (e.g., about 0.635 cm to about 3.81 cm), about 0.5 inches to about 1 inch (e.g., about 1.27 cm to about 2.54 cm), or about 0.5 inches (e.g., about 1.27 cm).

If the position of the ground engaging tools is within the threshold range of the target ground engaging tool position, the controller 124 may activate the automatic control mode by instructing the actuator 212 of the manual raise valve 204 to move the manual raise valve 204 to the second position 210. With the manual raise valve 204 in the second position 210, fluid flow from the manual control valve 38 to the second connecting conduit 186/first cylinder conduit 152 is blocked, thereby blocking fluid flow from the manual control valve 38 to the cap end 52 of the actuator 22. In addition, the controller 124 may instruct the actuator 220 of the manual lower valve 206 to move the manual lower valve 206 to the second position 218. With the manual lower valve 206 in the second position 218, fluid flow from the manual control valve 38 to the first connection conduit 185/second cylinder conduit 154 is blocked, thereby blocking fluid flow from the manual control valve 38 to the rod end 54 of the actuator 22. Accordingly, control input from the manual control valve 38 is disabled. Furthermore, the controller 124 may control the raise control valve 158, the lower control valve 160, the raise return valve 182, and the lower return valve 184 to adjust the position of the ground engaging tools relative to the soil surface, as described above. Automatically reactivating the automatic control mode/deactivating the manual control mode in response to determining that the position of the ground engaging tools is within the threshold distance from the target ground engaging tool position may substantially reduce or eliminate the possibility of the ground engaging tools penetrating the soil at an undesirable depth.

The automatic control mode may also be activated by moving the manual control valve 38 to the neutral position, and instructing, via the user interface 134, the controller 124 to engage automatic control. For example, an operator may raise the ground engaging tools above the target position during a turn between sequential rows in a field by moving the manual control valve 38 to the raise position, which engages the manual control mode/disengages the automatic control mode. The operator may then move the manual control valve 38 to the neutral position and instruct the controller 124 to reactivate the automatic control mode by providing input to the user interface 134. The controller 124 may determine whether the manual control valve 38 is in the neutral position by comparing the pressure within the first manual control conduit 148 (e.g., as determined based on feedback from the pressure sensor 126) to a threshold pressure associated with the manual control valve 38 being in the neutral position or the lower position. The controller 124 may also determine whether the position of the ground engaging tools relative to the soil surface is substantially constant (e.g., based on feedback from the position sensor 128). If the position of the ground engaging tools relative to the soil surface is substantially constant and the fluid pressure within the first manual control conduit 148 is below the threshold pressure, the controller 124 may determine that the manual control valve 38 is in the neutral position. Upon determining that the manual control valve 38 is in the neutral position and receiving instructions (e.g., from the user interface 134) indicative of activation of the automatic control mode, the controller 124 may activate the automatic control mode (e.g., control the automatic control valve assembly 156 to position the ground engaging tools at the target position).

Because each of the raise control valve 158, the lower control valve 160, the raise return valve 182, the lower return valve 184, the manual raise valve 204, and the manual lower valve 206 includes a respective biasing element configured to drive the valve to the respective first position, the valves may move to the respective first positions in response to a loss of electrical power (e.g., which deactivates each valve actuator). As previously discussed, with the raise control valve 158, the lower control valve 160, the raise return valve 182, the lower return valve 184, the manual raise valve 204, and the manual lower valve 206 in the respective first positions, fluid flow from the supply conduit 140 to the actuator 22 is blocked, fluid flow from the actuator 22 to the return conduit 142 is blocked, and fluid flow from the manual control valve 38 to the actuator 22 is enabled. Accordingly, if electrical power to the valve actuators is interrupted, manual control of the actuator 22 is automatically enabled.

While the automatic control valve assembly 156 includes the raise control valve 158, the lower control valve 160, the raise return valve 182, the lower return valve 184, the manual raise valve 204, and the manual lower valve 206 in the illustrated embodiment, in other embodiments, the automatic control valve assembly may include other and/or additional valves. For example, in certain embodiments, the raise control valve and the lower control valve may be combined into a single valve having a raise position, a lower position, and a neutral position. Similarly, the raise return valve and the lower return valve may be combined into a single valve having a raise return position, a lower return position, and a neutral position. In addition, while the implement control system described above is driven by hydraulic fluid, in other embodiments, the implement control system may be driven by air (e.g., a pneumatic system) or another suitable fluid.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. An implement control system comprising:
   a supply conduit configured to receive fluid from a fluid source;
   a return conduit configured to output the fluid to a reservoir;
   a first inlet configured to fluidly couple to a manual control valve;
   a second inlet configured to fluidly couple to the manual control valve;
   a first manual control conduit fluidly coupled to the first inlet and configured to provide fluid flow to cause a cylinder to raise a ground engaging tool relative to a soil surface;
   a second manual control conduit fluidly coupled to the second inlet and configured to provide fluid flow to cause the cylinder to lower the ground engaging tool relative to the soil surface;
   an automatic control valve assembly fluidly coupled to the supply conduit and the return conduit, wherein the automatic control valve assembly is configured to utilize fluid flow from the supply conduit to cause the cylinder to raise the ground engaging tool relative to the soil surface and to utilize fluid flow from the supply conduit to cause the cylinder to lower the ground engaging tool relative to the soil surface while an automatic control mode is active;

a pressure sensor fluidly coupled to the first manual control conduit and configured to output a signal indicative of a fluid pressure within the first manual control conduit; and a controller comprising a memory and a processor, wherein the controller is communicatively coupled to the automatic control valve assembly and the pressure sensor, the controller is configured to control the automatic control valve assembly based on a position of the ground engaging tool relative to the soil surface to control the position of the ground engaging tool relative to the soil surface while the automatic control mode is active, and the controller is configured to deactivate the automatic control mode in response to the fluid pressure within the first manual control conduit exceeding a threshold pressure.

2. The implement control system of claim 1, comprising a position sensor configured to output a second signal indicative of the position of the ground engaging tool relative to the soil surface.

3. The implement control system of claim 1, wherein the controller is configured to activate the automatic control mode in response to determining that the position of the ground engaging tool is within a threshold distance from a target ground engaging tool position.

4. The implement control system of claim 1, wherein the controller is configured to activate the automatic control mode in response to the fluid pressure within the first manual control conduit being below a second threshold pressure, determining that the position of the ground engaging tool is substantially constant, and receiving a third signal from a user interface indicative of activation of the automatic control mode.

5. The implement control system of claim 1, wherein the automatic control valve assembly comprises a raise control valve and a lower control valve, the raise control valve is configured to control fluid flow from the supply conduit to a first end of the cylinder to cause the cylinder to raise the ground engaging tool relative to the soil surface, and the lower control valve is configured to control fluid flow from the supply conduit to a second end of the cylinder to cause the cylinder to lower the ground engaging tool relative to the soil surface.

6. The implement control system of claim 5, wherein the automatic control valve assembly comprises a raise return valve and a lower return valve, the raise return valve is configured to selectively facilitate fluid flow from the second end of the cylinder to the return conduit while the raise control valve is active, and the lower return valve is configured to selectively facilitate fluid flow from the first end of the cylinder to the return conduit while the lower control valve is active.

7. The implement control system of claim 1, comprising a cylinder control valve configured to control fluid flow from the supply conduit to the cylinder and to control fluid flow from the cylinder to the return conduit, wherein the automatic control valve assembly is configured to control the cylinder control valve to control the position of the ground engaging tool relative to the soil surface.

8. An implement control system, comprising:
a supply conduit configured to receive fluid from a fluid source;
a return conduit configured to output the fluid to a reservoir;

a cylinder control valve fluidly coupled to the supply conduit and the return conduit, wherein the cylinder control valve is configured to fluidly couple to a first end of a cylinder and to a second end of the cylinder, the cylinder control valve has a first position configured to block fluid flow between the supply conduit and the first and second ends of the cylinder and between the return conduit and the first and second ends of the cylinder, the cylinder control valve has a second position configured to facilitate fluid flow between the supply conduit and the first end of the cylinder and between the return conduit and the second end of the cylinder to drive the cylinder to raise a ground engaging tool relative to a soil surface, the cylinder control valve has a third position configured to facilitate fluid flow between the supply conduit and the second end of the cylinder and between the return conduit and the first end of the cylinder to drive the cylinder to lower the ground engaging tool relative to the soil surface, the cylinder control valve includes a raise actuator configured to drive the cylinder control valve to the second position, and the cylinder control valve includes a lower actuator configured to drive the cylinder control valve to the third position;

a first inlet configured to fluidly couple to a manual control valve;

a second inlet configured to fluidly couple to the manual control valve;

a first manual control conduit configured to establish a fluid connection between the first inlet and the raise actuator of the cylinder control valve;

a second manual control conduit configured to establish a fluid connection between the second inlet and the lower actuator of the cylinder control valve;

an automatic control valve assembly fluidly coupled to the supply conduit, the return conduit, the raise actuator of the cylinder control valve, and the lower actuator of the cylinder control valve, wherein the automatic control valve assembly is configured to control the cylinder control valve;

a pressure sensor fluidly coupled to the first manual control conduit and configured to output a signal indicative of a fluid pressure within the first manual control conduit; and a controller comprising a memory and a processor, wherein the controller is communicatively coupled to the automatic control valve assembly and to the pressure sensor, the controller is configured to control the automatic control valve assembly based on a position of the ground engaging tool relative to the soil surface to control the position of the ground engaging tool relative to the soil surface, and the controller is configured to instruct the automatic control valve assembly to block fluid flow from the supply conduit to the raise actuator and the lower actuator of the cylinder control valve in response to the fluid pressure within the first manual control conduit exceeding a threshold pressure.

9. The implement control system of claim 8, wherein the automatic control valve assembly comprises a raise control valve and a lower control valve, the raise control valve is configured to control fluid flow from the supply conduit to the raise actuator of the cylinder control valve, and the lower control valve is configured to control fluid flow from the supply conduit to the lower actuator of the cylinder control valve.

10. The implement control system of claim 9, wherein the raise control valve has a first position configured to block fluid flow between the supply conduit and the raise actuator of the cylinder control valve, the raise control valve has a second position configured to facilitate fluid flow between the supply conduit and the raise actuator of the cylinder control valve, and the raise control valve comprises an actuator communicatively coupled to the controller and configured to move the raise control valve between the first and second positions; and wherein the lower control valve has a first position configured to block fluid flow between the supply conduit and the lower actuator of the cylinder control valve, the lower control valve has a second position configured to facilitate fluid flow between the supply conduit and the lower actuator of the cylinder control valve, and the lower control valve comprises an actuator communicatively coupled to the controller and configured to move the lower control valve between the first and second positions.

11. The implement control system of claim 9, wherein the automatic control valve assembly comprises a shuttle valve having a first input fluidly coupled to the first manual control conduit, a second input fluidly coupled to the raise control valve, and an outlet fluidly coupled to the raise actuator of the cylinder control valve, wherein the shuttle valve is configured to block fluid flow from the first manual control conduit to the raise actuator of the cylinder control valve while fluid pressure from the raise control valve is greater than the fluid pressure within the first manual control conduit, and the shuttle valve is configured to block fluid flow from the raise control valve to the raise actuator of the cylinder control valve while the fluid pressure within the first manual control conduit is greater than the fluid pressure from the raise control valve.

12. The implement control system of claim 9, wherein the automatic control valve assembly comprises a selection control valve having a first position configured to block fluid flow from the lower control valve to the lower actuator of the cylinder control valve and to facilitate fluid flow from the second manual control conduit to the lower actuator of the cylinder control valve, the selection control valve has a second position configured to facilitate fluid flow from the lower control valve to the lower actuator of the cylinder control valve and to block fluid flow from the second manual control conduit to the lower actuator of the cylinder control valve, and the selection control valve comprises an actuator communicatively coupled to the controller and configured to move the selection control valve between the first and second positions.

13. The implement control system of claim 12, wherein the controller is configured to instruct the actuator of the selection control valve to transition the selection control valve to the second position in response to determining that the position of the ground engaging tool is within a threshold distance from a target ground engaging tool position.

14. The implement control system of claim 8, comprising a position sensor communicatively coupled to the controller, wherein the position sensor is configured to output a second signal indicative of the position of the ground engaging tool relative to the soil surface.

15. An implement control system, comprising:
a supply conduit configured to receive fluid from a fluid source;
a return conduit configured to output the fluid to a reservoir;
a first inlet configured to fluidly couple to a manual control valve;
a second inlet configured to fluidly couple to the manual control valve;
a first manual control conduit fluidly coupled to the first inlet and configured to fluidly couple to a first end of a cylinder;
a second manual control conduit fluidly coupled to the second inlet and configured to fluidly couple to a second end of the cylinder;
an automatic control valve assembly fluidly coupled to the supply conduit, the return conduit, the first end of the cylinder, and the second end of the cylinder, wherein the automatic control valve assembly is configured to provide fluid flow from the supply conduit to the first end of the cylinder to cause the cylinder to raise a ground engaging tool relative to a soil surface, and the automatic control valve assembly is configured to provide fluid flow from the supply conduit to the second end of the cylinder to cause the cylinder to lower the ground engaging tool relative to the soil surface;
a pressure sensor fluidly coupled to the first manual control conduit and configured to output a signal indicative of a fluid pressure within the first manual control conduit; and
a controller comprising a memory and a processor, wherein the controller is communicatively coupled to the automatic control valve assembly and the pressure sensor, the controller is configured to control the automatic control valve assembly based on a position of the ground engaging tool relative to the soil surface to control the position of the ground engaging tool relative to the soil surface while an automatic control mode is active, and the controller is configured to deactivate the automatic control mode and to instruct the automatic control valve assembly to block fluid flow from the supply conduit to the cylinder in response to the fluid pressure within the first manual control conduit exceeding a threshold pressure.

16. The implement control system of claim 15, wherein the automatic control valve assembly comprises a manual raise valve and a manual lower valve, the manual raise valve and the manual lower valve are communicatively coupled to the controller, the manual raise valve is fluidly coupled to the first manual control conduit, the manual lower valve is fluidly coupled to the second manual control conduit, and the controller is configured to instruct the manual raise valve and the manual lower valve to block fluid flow through the first manual control conduit and the second manual control conduit while the automatic control mode is active.

17. The implement control system of claim 15, wherein the automatic control valve assembly comprises a raise control valve and a lower control valve, the raise control valve is configured to control fluid flow from the supply conduit to the first end of the cylinder, and the lower control valve is configured to control fluid flow from the supply conduit to the second end of the cylinder.

18. The implement control system of claim 17, wherein the automatic control valve assembly comprises a raise return valve and a lower return valve, the raise return valve is configured to selectively facilitate fluid flow from the second end of the cylinder to the return conduit while the raise control valve is active, and the lower return valve is configured to selectively facilitate fluid flow from the first end of the cylinder to the return conduit while the lower control valve is active.

19. The implement control system of claim 15, comprising a position sensor communicatively coupled to the controller, wherein the position sensor is configured to output a second signal indicative of the position of the ground engaging tool relative to the soil surface.

20. The implement control system of claim 15, wherein the controller is configured to activate the automatic control mode in response to determining that the position of the ground engaging tool is within a threshold distance from a target ground engaging tool position.

\* \* \* \* \*